(12) United States Patent
Lee et al.

(10) Patent No.: US 10,197,809 B2
(45) Date of Patent: Feb. 5, 2019

(54) DISPLAY SYSTEM BASED ON HOLOGRAM AND HOLOGRAM DISPLAY METHOD USING THE SAME

(71) Applicant: GWANGJU INSTITUTE OF SCIENCE AND TECHNOLOGY, Gwangju (KR)

(72) Inventors: Yong Yi Lee, Gwangju (KR); Kwan Heng Lee, Gwangju (KR); Moon Gu Son, Gwangju (KR); Bilal Ahmed, Gwangju (KR); Jong Hun Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 123 days.

(21) Appl. No.: 15/363,582

(22) Filed: Nov. 29, 2016

(65) Prior Publication Data
US 2017/0255023 A1    Sep. 7, 2017

(30) Foreign Application Priority Data

Mar. 2, 2016    (KR) .................. 10-2016-0025314

(51) Int. Cl.
*G02B 27/22*    (2018.01)
*G02B 5/32*    (2006.01)
(Continued)

(52) U.S. Cl.
CPC .......... *G02B 27/2292* (2013.01); *G02B 5/32* (2013.01); *G02B 27/108* (2013.01); *G06T 7/85* (2017.01);
(Continued)

(58) Field of Classification Search
None
See application file for complete search history.

(56) References Cited

U.S. PATENT DOCUMENTS

2013/0276280 A1* 10/2013 Wielens ................. B23Q 17/22
                                                           29/407.04
2014/0198362 A1*  7/2014 Tseng ....................... G02B 5/32
                                                              359/15
(Continued)

FOREIGN PATENT DOCUMENTS

| KR | 1020080056593 A | 6/2008 |
| KR | 1020080098778 A | 11/2008 |
| KR | 1020150112440 A | 10/2015 |

OTHER PUBLICATIONS

[Supportive Materials for Exception to Loss of Novelty] Lee, Yong Yi et al., "Exhibition of Spatially Augmented Digital Content using a 3D Pseudo Hologram", Proceedings of the Society of CAD/CAM Conference, Published on Jan. 27, 2016, total 6 pages.
(Continued)

*Primary Examiner* — Michael J Hess
(74) *Attorney, Agent, or Firm* — Hauptman Ham, LLP

(57) ABSTRACT

The present disclosure relates to a holographic display system including: a projection object having a three-dimensional shape corresponding to an original item; an image projection unit comprising projectors projecting unit images of parts selected from a three-dimensional image of the original item on the projection object; and a reflector disposed adjacent to the projection object and reflecting images reflected from the projection object to provide an augmented three-dimensional holographic image. In the disclosure, the unit images corresponding to a three-dimensional image of an original item are projected on the projection object having a three-dimensional shape corresponding to the original item using the projectors and reflected by the projection object and augmented by the reflector, thereby providing a virtual image having three dimensional information corresponding to the original item, whereby a proper image is (Continued)

provided to an observer even when the viewpoint of the observer is changed.

18 Claims, 10 Drawing Sheets

(51) Int. Cl.
G06T 7/80 (2017.01)
H04N 13/327 (2018.01)
G02B 27/10 (2006.01)
H04N 9/31 (2006.01)
H04N 13/388 (2018.01)

(52) U.S. Cl.
CPC ......... H04N 9/3185 (2013.01); H04N 13/327 (2018.05); H04N 13/388 (2018.05); *G06T 2207/10028* (2013.01)

(56) References Cited

U.S. PATENT DOCUMENTS

| | | | |
|---|---|---|---|
| 2015/0147684 A1* | 5/2015 | Heidt | G03F 7/70408 430/2 |
| 2016/0353071 A1* | 12/2016 | Chen | H04N 9/3185 |
| 2017/0161950 A1* | 6/2017 | Seder | G02B 27/01 |
| 2018/0081059 A1* | 3/2018 | Lardin | G01S 7/4817 |

OTHER PUBLICATIONS

Yi, Xu et al., "Robust Pixel Classification for 3D Modeling with Structured Light", Proceeding of Graphics Interface 2007, pp. 233-240, 2007, total 8 pages.

Korean Office Action dated Dec. 12, 2016, issued in corresponding Korean Patent Application No. 10-2016-0025314.

* cited by examiner

DISPLAY SYSTEM BASED ON HOLOGRAM AND HOLOGRAM DISPLAY METHOD USING THE SAME

CROSS REFERENCE TO RELATED APPLICATION

This application claims the benefit of Korean Patent Application No. 10-2016-0025314, filed on Mar. 2, 2016, entitled "DISPLAY SYSTEM BASED ON HOLOGRAM AND HOLOGRAM DISPLAY METHOD USING THE SAME", which is hereby incorporated by reference in its entirety into this application.

BACKGROUND

1. Technical Field

The present invention relates to a holographic display system and a holographic display method using the same. More particularly, the present invention relates to a holographic display system which displays a three-dimensional holographic image of a display, and a holographic display method using the same.

2. Description of the Related Art

With the development of an information-oriented society, expression of information has become an important issue in addition to processing and transmission of information.

Thereamong, the demand for techniques of providing visual expression of information, particularly, the demand for a three-dimensional display method and apparatus is considerably increasing. With the trend of focusing on user experience, there is demand for a display system which allows communication between visitors and articles on exhibition rather than one-sided exhibition of displays. In addition, in order to solve problems due to a limited exhibition space and a shortage of articles on exhibition, there is a need for a new type of exhibition space.

Recently, technology such as augmented reality, holography, and projection mapping is used to maximize display effects. However, such technology has a limitation in realizing a unique texture of an original exhibit and has difficulty blending with a surrounding environment, thereby making visitors lose interest or causing distraction.

Thus, a pseudo holographic system, which is a display system capable of visualizing a floating virtual image to allow viewing of various exhibits in a limited space, takes attention.

In such a pseudo holographic system, an image to be presented or displayed is projected on a projection screen on the bottom of a stage using a high-resolution projector such that the projected image can be reflected toward a foil disposed at an angle of 45 degrees with respect to the stage. The reflected image is transmitted through the foil, thereby finally creating an optical illusion floating in a space above the stage.

However, a typical pseudo holographic system literally provides a pseudo hologram, resembling a hologram having a complete three-dimensional geometry, by projecting an image on a two-dimensional projection screen using a high-resolution projector such that the image can be reflected by the projection screen. Thus, a resulting final image does not contain three-dimensional information. Thus, when the point of view of an observer is horizontally changed, the final image cannot reflect changes in the point of view. As a result, the observer viewing a pseudo hologram having no three-dimensional geometry information feels that the holographic exhibit is very different from an original article, causing deterioration in merchantable quality of the exhibit or an exhibited image.

BRIEF SUMMARY

Embodiments of the present invention have been conceived to solve such a problem in the art and provide a holographic display system which projects unit images corresponding to a three-dimensional image on a projection object having a three-dimensional shape corresponding to an original item, and a holographic display method using the same.

In accordance with one aspect of the present invention, a holographic display system includes: a projection object having a three-dimensional shape corresponding to an original item; an image projection unit comprising a plurality of projectors projecting unit images of parts of selected from a three-dimensional image of the original item on the projection object; and a reflector disposed adjacent to the projection object and reflecting images reflected from the projection object to provide an augmented three-dimensional holographic image.

The holographic display system may further include a skew prevention unit controlling the image projection unit to prevent the unit images projected on the projection object by the projectors from being skewed.

The skew prevention unit may include: a plurality of cameras disposed adjacent to the respective projectors and capturing the unit images projected on the projection object by the respective projectors; and a controller controlling the projectors and the cameras to prevent the unit images projected on the projection object from being skewed based on image information obtained by the cameras.

The skew prevention unit may further include an image guide unit guiding the cameras for the cameras to capture images of the unit images projected on the projection object, as seen from the viewpoint of the respective projectors.

The image guide unit may include a plurality of beam splitters provided to each of the projectors and transmitting output light emitted from the projector to the projection object and reflecting fractions of light reflected by the projection object which are incident toward the projector in a direction parallel to an optical axis of the output light toward the cameras.

In accordance with another aspect of the present invention, a hologram display method includes: photographing a three-dimensional image corresponding to an original item; fabricating a projection object having a three-dimensional shape corresponding to the original item; installing a plurality of projectors to project unit images of parts of selected from the three-dimensional image corresponding to the original item on the projection object; installing cameras to capture the unit images projected on the projection object by the projectors; setting the projectors and the cameras to prevent the unit images emitted from the projectors from being skewed; installing a reflector adjacent to the projection object to reflect images reflected by the projection object to provide an augmented holographic image; and displaying the holographic image by projecting the unit images on the projection object through the projectors.

Setting the projectors and the cameras may include: calibrating the projectors and the cameras; calculating a pixel correspondence between the images projected by the projectors and the images captured by the cameras; estimating three-dimensional geometry information of a projection surface as seen from the viewpoint of the projectors based on calibration information of the projectors and the cameras obtained in the step of calibrating the projectors and the cameras and information on the pixel correspondence between the images projected by the projector and the images captured by the cameras and obtained in the step of calculating the pixel correspondence; and estimating a posture of the three-dimensional image based on the three-dimensional geometry information obtained in the step of estimating three-dimensional geometry information.

Calibrating the projectors and the cameras may include: projecting a setting image having a predetermined pattern on a setting plate having a predetermined pattern through the projectors, followed by photographing the setting image using the cameras; acquiring calibration information for calibrating the projectors and the cameras based on the setting image and image information obtained by capturing the setting image projected on the setting plate; and calibrating the projectors and the cameras based on the calibration information to complete setting.

A projection surface of the setting plate on which the setting image is projected from the projectors may have a checkered pattern.

Photographing a setting image may include sequentially varying the setting position of the setting plate to various postures and projecting setting images having different patterns on the setting plate according to the setting position.

Calculating a pixel correspondence may include: projecting a sample image on the projection object through the projectors, followed by capturing an image of the projection object with the sample image projected thereon using the cameras; and calculating information on a pixel correspondence between images projected on the projection object by the projectors and images of the projection object captured by the cameras through comparison of the sample image with the images captured by the cameras.

The sample image may have a pattern in which multiple black unit patterns extending in one of longitudinal and transverse directions of the projection object are arranged at a distance from one another in the other direction of the projection object.

Calculating a pixel correspondence may further include: virtually reconstructing images of the projection object, as seen from the viewpoint of the projectors, based on the images captured by the cameras using the information on the pixel correspondence between the images projected on the projection object and the images captured by the cameras obtained in the step of calculating the information on the pixel correspondence.

Installing the cameras may include: primarily installing the cameras adjacent to the respective projectors; and secondarily installing an image guide unit guiding cameras for the cameras to capture images of the unit images projected on the projection object, as seen from the viewpoint of the projectors, on each of the projectors and the cameras.

The image guide unit includes a plurality of beam splitters provided to each of the projectors and transmitting output light emitted from the projector to the projection object and reflecting fractions of light reflected by the projection object which are incident toward the projector in a direction parallel to an optical axis of the output light toward the camera.

Displaying the holographic image may include: setting partial images of the three-dimensional image corresponding to projection areas of the projection object covered by the respective projectors as the unit images; and projecting the unit images on the projection object using the respective projectors.

According to the present invention, it is possible to provide a holographic display system which projects unit images corresponding to a three-dimensional image of an original item on a projection object having a three-dimensional shape corresponding to the original item using the plurality of projectors, and allows the unit images to be reflected by the projection object and augmented by the reflector, thereby providing a virtual image having three dimensional information corresponding to the original item, whereby a proper image can be provided to an observer even when the viewpoint of the observer is changed, and a holographic display method using the same.

BRIEF DESCRIPTION OF THE DRAWINGS

The above and other aspects, features, and advantageous effects of the present invention will become apparent from the detailed description of the following embodiments in conjunction with the accompanying drawings, in which.

DETAILED DESCRIPTION

Figure 1:
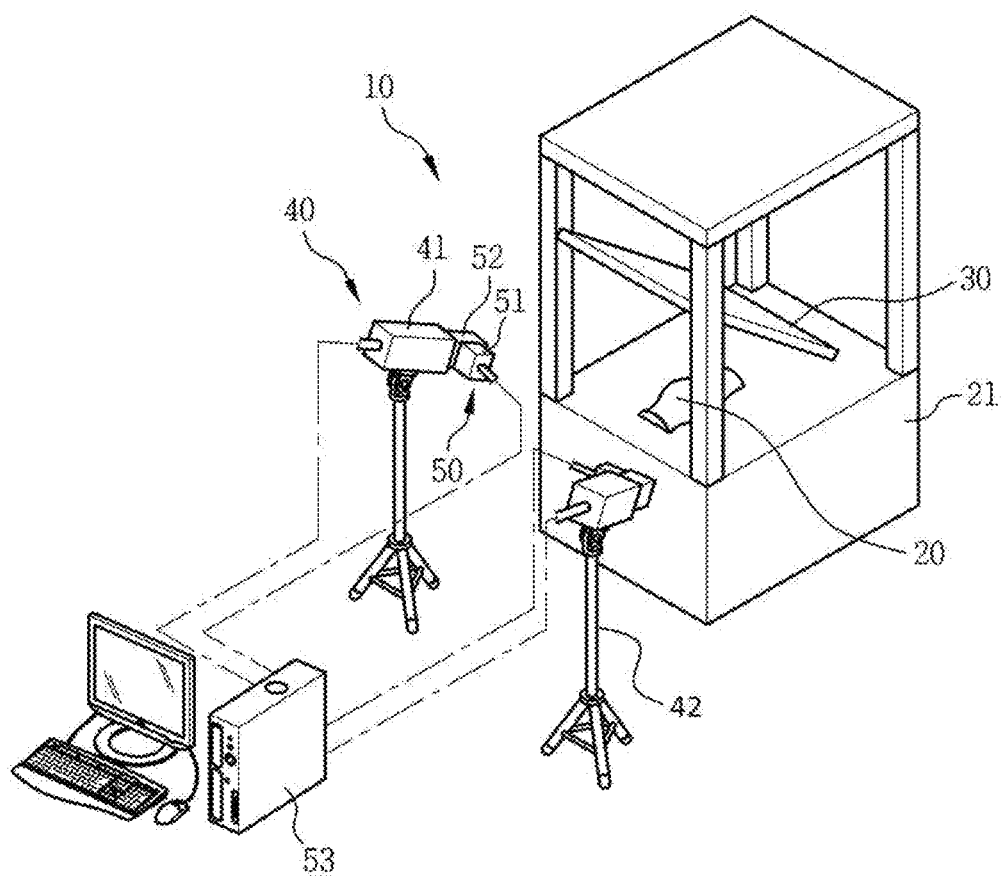
FIG. 1 is a perspective view of a holographic display system according to the present invention.

Hereinafter, exemplary embodiments of the present invention will now be described in detail with reference to the accompanying drawings. However, it should be understood that the present invention is not limited to the following embodiments and may be embodied in different ways by those skilled in the art without departing from the scope of the present invention. Further, it should be understood that various modifications and equivalent embodiments may be made by those skilled in the art without departing from the spirit and scope of the present invention. In the drawings, the thicknesses of layers and regions can be exaggerated or omitted for clarity. The same components will be denoted by the same reference numerals throughout the specification.

It will be understood that, although the terms "first", "second", "A", "B", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element or component discussed below could also be termed a "second" element or component, or vice versa, without departing from the scope of the present invention.

The terminology is used herein for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups.

Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Figure 2:
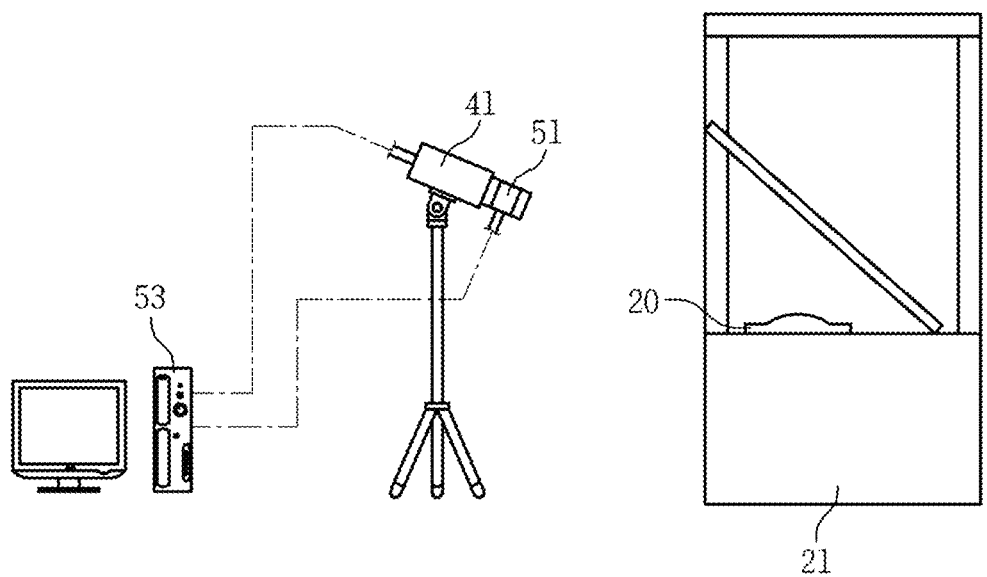
FIG. 2 is a side view of the holographic display system of FIG. 1.

FIGS. 1 and 2 show a holographic display system 10 according to the present invention.

Referring to FIGS. 1 and 2, the holographic display system 10 includes a projection object 20 having a three-dimensional shape corresponding to an original item, an image projection unit 40 including a plurality of projectors 41 projecting unit images of a three-dimensional image corresponding to the original item on the projection object 20, a reflector 30 disposed adjacent to the projection object 20 and reflecting images reflected from the projection object 20 to provide an augmented three-dimensional holographic image, a skew prevention unit 50 controlling the image projection unit 40 to prevent the unit images projected on the projection object 20 by the projector 41 from being skewed.

The projection object 20 has a three-dimensional shape corresponding to the original item. The projection object 20 is fixed to an upper surface of the display table 21. The projection object 20 has a white projection surface to easily reflect the unit images projected from the projector 41.

The projection surface of the projection object 20 is preferably coated with a diffuse spray to prevent glossy reflectance depending on the material of the projection object 20.

The reflector 30 is disposed on the table 21 and above the projection object 20. The reflector 30 extends in a front and back direction and is disposed at an angle such that a front end thereof is located above a rear end thereof. Preferably, the reflector 30 is disposed at an angle of 45° with respect to the upper surface of the table 21 on which the projection object 20 is disposed.

The reflector 30 is preferably formed of a material such as special heat-treated glass or polycarbonate having a predetermined reflectance and transmittance to reflect the images reflected by the projection object 20 to provide an augmented three-dimensional holographic image.

The image projection unit 40 includes a plurality of stands 42 disposed in front of the table to be separated from each other in the right and left direction and a plurality of projectors 41 mounted on the respective stands 42 and projecting the unit images on the projection object 20.

Although a DLP-type projector having a resolution of 1280×800 and a brightness of 1,000 ANSI lumens is preferably used as the projector 41, it should be understood that the present invention is not limited thereto and the projector 41 may be any suitable device so long as the device can project a clear image on the projection object 20. In addition, although two projectors 41 are shown in FIG. 1, it should be understood that the present invention is not limited thereto and three or more projectors may be provided depending on the size of the original item.

Figure 3:
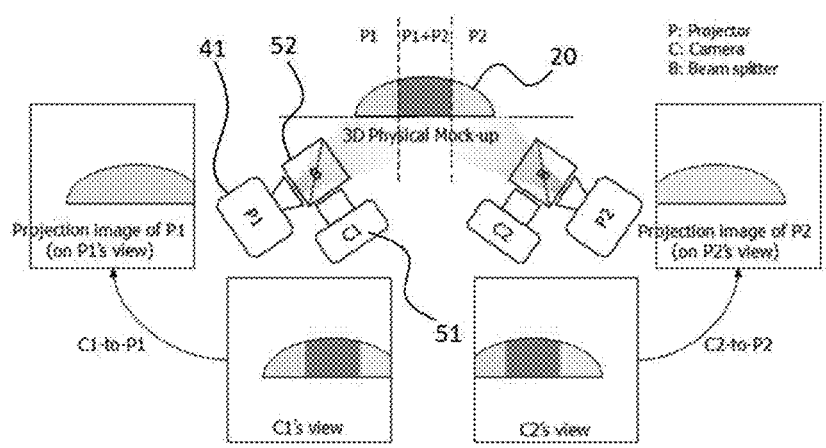
FIG. 3 is a conceptual diagram of the holographic display system of FIG. 1.

Referring to FIG. 3, the skew prevention unit 50 includes: a plurality of cameras 51 disposed adjacent to the respective projectors 41 and capturing images of the unit images projected on the projection object 20 from the projector 41; an image guide unit guiding the unit image for the cameras 51 to capture images of the unit images projected on the projection object 20, as seen from the viewpoint of the projectors 41; a controller 53 controlling the projectors 41 to prevent the unit images projected on the projection object 20 from being skewed based on image data obtained by the cameras 51.

The cameras 51 are mounted on the stands 42 to be adjacent to the projectors 41, respectively. Although it is desirable that a camera having a pixel resolution of 4928× 3280 be used as the camera 51, it should be understood that the present invention is not limited thereto and the camera may be any suitable photographing equipment so long as the equipment can capture a clear image of the images projected on the projection object 20.

Here, the unit images refer to partial images of the three-dimensional image corresponding to projection areas of the projection object 20 covered by the respective projectors 41, wherein the partial images are two-dimensional images.

The image guide unit is provided to each of the projectors 41 and includes a plurality of beam splitters 52 which transmit output light emitted from the projector 41 to the projection object 20 and reflect fractions of light reflected by the projection object 20, incident on the projector 41 in a direction parallel to an optical axis of the output light, toward the camera 51.

Since the cameras 51 receive reflected light incident parallel to the optical axis of the output light emitted from the projector 41, the cameras 51 can capture an image of the projection object 20, as seen from the viewpoint of the projector 41. In this way, the cameras 51 capture an image of the projection object 20, as seen from the viewpoint of the projector 41, whereby it is possible to minimize errors when pixel correspondence information is acquired in a correspondence definition step (S152) of a holographic display method to be described further below.

The controller 53 controls the projectors 41 and the cameras 51 based on image information obtained by the cameras 51 so as to prevent the unit images projected on the projection object 20 from being skewed.

Referring to FIG. 3, there are overlapping portions between the unit images projected on the projection object 20 by the projectors 41. The controller 53 may adjust the unit images projected by the projectors 41 to prevent the overlapping portions from being skewed.

In addition, the controller 53 adjusts the focus and direction of the projectors 41 and the cameras 51 through comparison and analysis of the unit images or sample images emitted by the projectors 41 and the images captured by the camera 51. A central processing unit (not shown) of the controller 53 calibrate the projectors 41 and the cameras 51 and calculate a pixel correspondence between the images emitted by the projectors 41 and the images captured by the camera 51.

Although not shown in the drawings, the holographic display system 10 according to the present invention may further include an editing unit configured to edit the multiple unit images corresponding to the viewpoint of the projectors 41 using the three dimensional image corresponding to the original item. Preferably, the unit images are edited in such a way that, when the unit images are projected on the projection object 20 by the projector 41s, the three-dimensional image can be wholly, rather than partly, formed.

Figure 4:
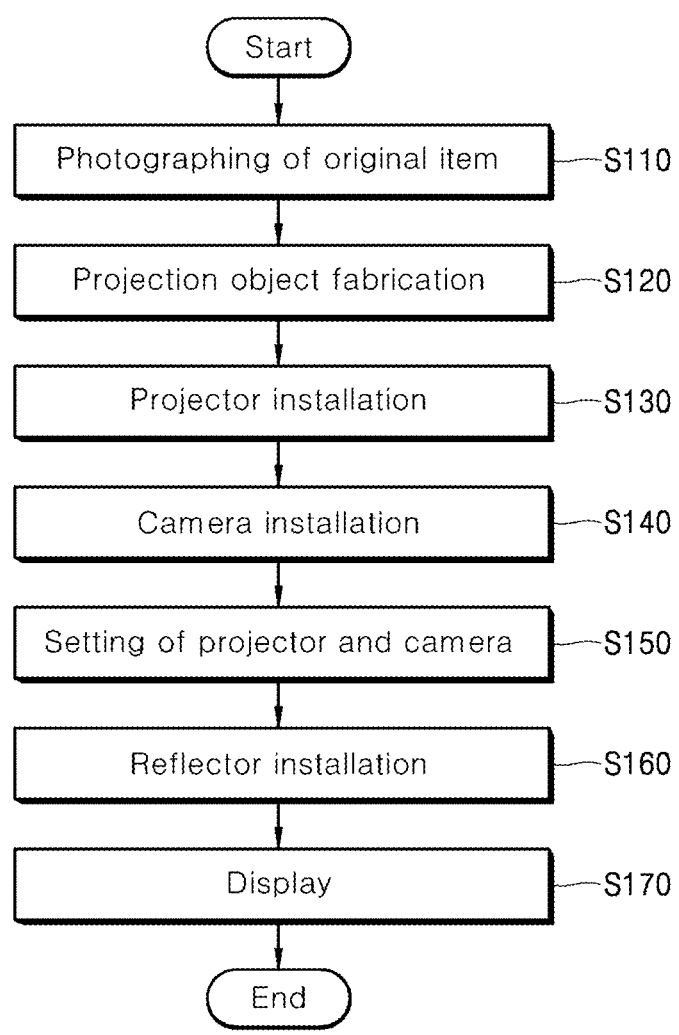
FIG. 4 is a flowchart of a hologram display method according to the present invention.

Next, a holographic display method using the holographic display system 10 according to the present invention will be described with reference to FIG. 4. The holographic display method includes the steps of photographing images (S110), fabricating a projection object (S120), installing projectors (S130), installing cameras (S140), setting (S150), installing reflectors (S160), and displaying (S170).

In the step of photographing (S110), a three-dimensional image corresponding to an original item is obtained. Specifically, the original item is photographed using a camera suitable for capturing a three-dimensional image, such as a time of flight (TOF) camera, thereby obtaining the three-dimensional image.

In the step of fabricating a projection object (S120), a projection object 20 having a three-dimensional shape corresponding to an original item is fabricated. Specifically, a mock-up having a shape corresponding to the original item is fabricated to be used as the projection object 20. Here, the projection object 20 may be fabricated using a 3D printer or by casting.

In the step of installing projectors (S130), a plurality of projectors 41 are installed to project unit images of the three-dimensional image corresponding to the original item on the projection object 20. First, plural stands are disposed in front of a table 21 to be spaced apart from one another in a right and left direction, followed by mounting the projectors 41 on the respective stands. Preferably, the projectors 41 are positioned to face an upper surface of the table 21 on which the projection object 20 is disposed.

In the step of installing cameras (S140), cameras 51 are installed to capture images of the unit images projected on the projection object 20 by the respective projectors 41. The step of installing cameras includes primary installation and secondary installation.

In primary installation, the cameras 51 are disposed adjacent to the respective projectors 41. Specifically, the cameras 51 are disposed on upper ends of the respective stands 42 to be adjacent to the respective projectors 41.

In secondary installation, an image guide unit guiding the unit image for the cameras 51 to capture images of the unit images projected on the projection object 20, as seen from the viewpoint of the projectors 41 is provided to each of the projectors 41 and the cameras 51. Specifically, beam splitters 52 of the image guide unit are provided to each of the projectors 41 and the cameras 51.

Figure 5:
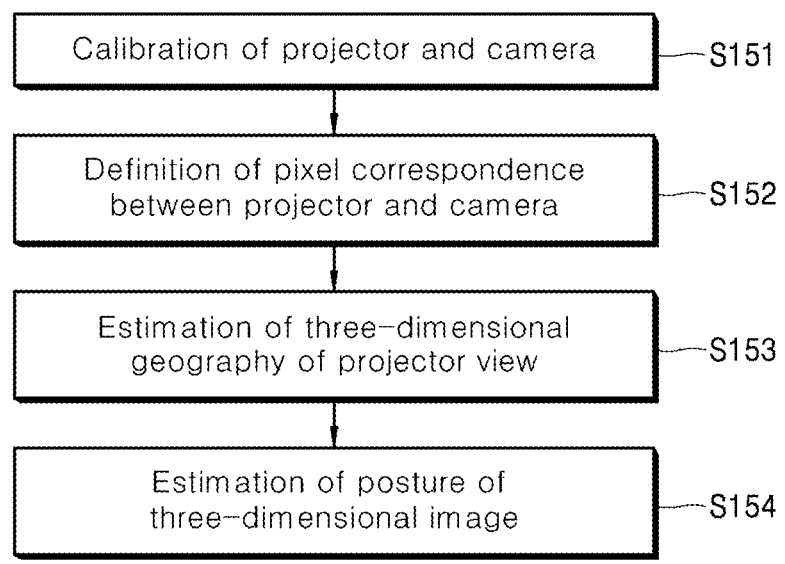
FIG. 5 is a flowchart of a setting process of the hologram display method according to the present invention.

In the step of setting (S150), the projectors 41 and the cameras 51 are set to prevent the unit images emitted from the projectors 41 from being skewed. Referring to FIG. 5, the step of setting includes the steps of calibrating (S151), defining a correspondence (S152), estimating a three-dimensional geometry (S153), and estimating a posture (S154).

In the step of calibrating (S151), the projectors and the cameras 51 are calibrated. The step of calibrating (S151) includes a setting image photographing step, an information acquisition step, and a setting completion step.

In the setting image photographing step, a setting image having a predetermined pattern is projected on a setting plate having a predetermined pattern by the projectors 41, followed by photographing the setting image projected on the setting plate using the cameras 51.

Figure 6:
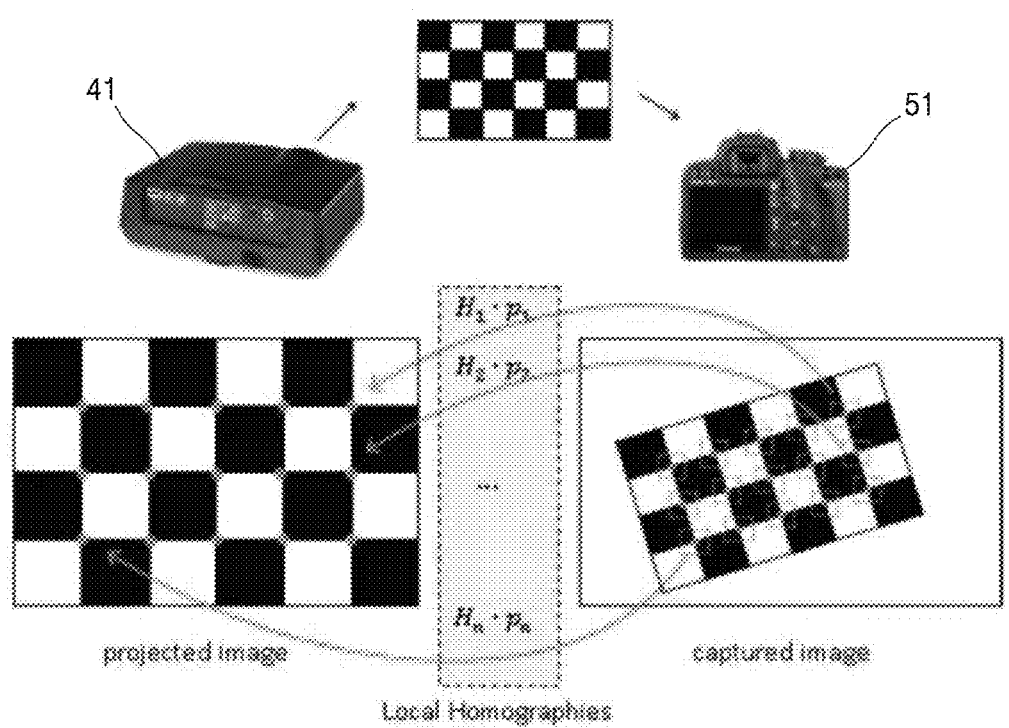
FIG. 6 is a conceptual diagram of the setting image photographing step of the hologram display method according to the present invention.

Preferably, an upper surface of the setting plate, corresponding to a projection surface on which the setting image is projected by the projector 41, has a black-and-white checkered pattern. Here, the setting images having different patterns are projected on the setting plate while sequentially varying the setting position of the setting plate. FIG. 6 is a conceptual view of the setting image photographing. As shown in FIG. 6, the setting plate having a checkered pattern is rotated or tilted to be positioned, while photographing the projection surface in each setting position using the camera 51.

Figure 7:
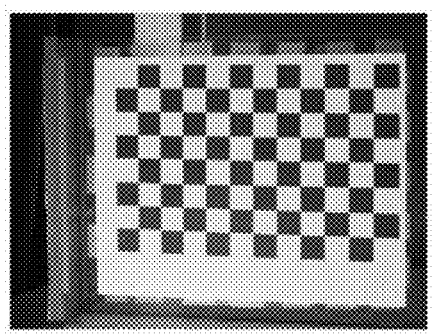
FIGS. 7 and 8 are real images of a setting plate used in the setting image photographing step and the setting plate with a setting image projected thereon, respectively.
Figure 8:
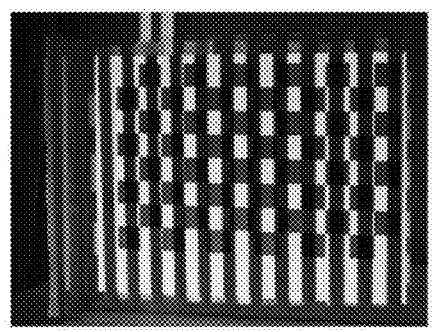

Here, each of the setting images has black patterns each having a predetermined length and being arranged to be spaced apart from another in a direction perpendicular to a longitudinal direction thereof. Preferably, the setting images have different degrees of tilting of the black patterns. FIGS. 7 and 8 are real images of the setting plate used in setting image photographing and the setting plate with the setting image projected thereon, respectively.

In the information acquisition step, calibration information is acquired based on the setting images and image information obtained by capturing the setting images projected on the setting plate. By encoding the setting images and the image information obtained by capturing the setting images projected on the setting plate, a correspondence between the projectors 41 and the cameras 51 may be calculated. In addition, calibration information may be acquired based on corner feature points of both of the checkered patterns of the setting images and the checkered patterns of the image information obtained by capturing the setting plate using the cameras 51. Here, the calibration information includes internal parameters such as the focal distance, principal point, and lens distortion of the projectors 41 and the cameras 51, and external parameters such as the relative distance and direction of the projectors 41 and the cameras 51.

In the setting completion step, the projectors 41 and the cameras 51 are calibrated based on the calibration information. The controller 53 adjusts setting of the projectors 41 and the cameras 51 based on the calibration information. Here, the setting of the projectors 41 and the cameras 51 may be more accurately adjusted through manual operation.

In the step of defining a correspondence definition (S152), a pixel correspondence between the images projected by the projectors and the images captured by the cameras 51 is calculated. The step of defining a correspondence definition includes a sample photographing step, an information calculation step, and an image reconstruction step.

In the sample photographing step, a sample image is projected on the projection object 20 by the projectors, followed by capturing an image of the projection object 20 with the sample image projected thereon using the cameras 51. Here, the setting plate on the table 21 is replaced with the projection object 20.

Figure 9:
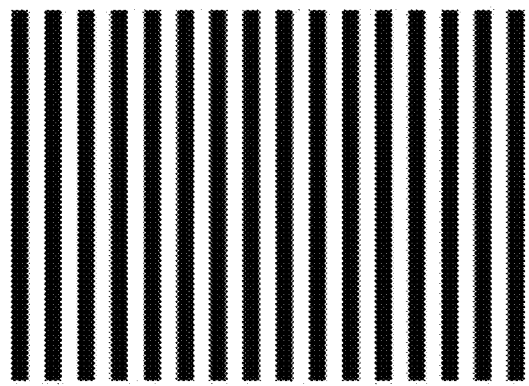
FIG. 9 shows a sample image used in sample photographing step of the hologram display method according to the present invention.
Figure 10:
FIG. 10 is a real image of a projection object with the sample image projected thereon in the sample photographing step.

FIG. 9 is a view of one example of the sample image. Referring to FIG. 9, the sample image has a structured-light pattern in which multiple black unit patterns extending in one of longitudinal and transverse directions of the projection object 20 are arranged at a distance from one another in the other direction of the projection object 20. FIG. 10 shows a real image of the projection object 20 with the sample image projected thereon.

In the information calculation step, information on the pixel correspondence between images projected on the projection object 20 by the projectors 41 and images of the projection object 20 captured by the cameras 51 through comparison of the sample image with the images captured by the camera 51. Here, the pixel correspondence information may be calculated by a structured-light-based pixel classification method. Such a structured-light based pixel classification method is disclosed in "Robust Pixel Classification for 3D Modeling with Structured Light, Proceedings of the Graphics Interface" (Yi Xu and Daniel G. Aliaga, 2007) and detailed description thereof will be omitted herein.

Figure 11:
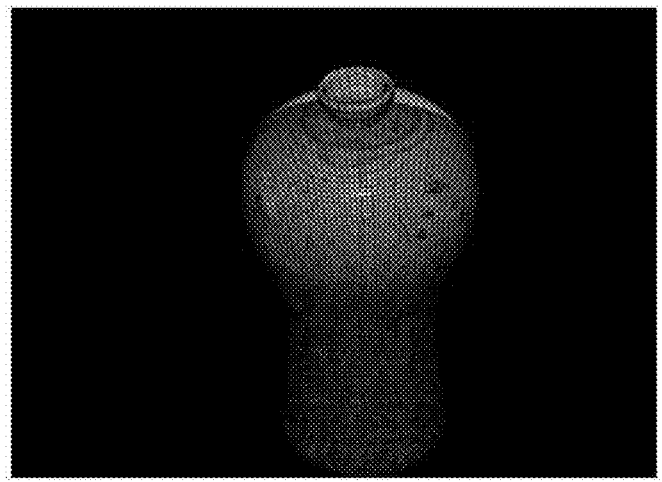
FIG. 11 shows an image obtained by virtually modeling a scene seen from the viewpoint of projectors based on images captured by cameras without consideration of a decoding error.

Here, in the process of defining the correspondence between the projectors 41 and the cameras 51 by the structured-light based pixel classification method, a decoding error can occur due to shadows, inter-reflection, specular reflection, and the like caused by properties of the projection object 20. Such a decoding error causes an ill-defined or undefined correspondence, disturbing image reconstruction. FIG. 11 shows an image obtained by virtually modeling a scene seen from the viewpoint of the projectors 41 based on the images captured by the cameras 51 without consideration of the decoding error. Referring to FIG. 11, it can be seen that black noise occurred due to the decoding error.

In order to solve such a noise problem caused by the decoding error, first, the images obtained by the cameras 51 are classified into adaptive patches based on color information. Here, image gradients of the Euclidean distance and pixel intensity in the CIELAB color space are calculated, followed by performing classification using a simple linear iterative clustering algorithm conducting segmentation of the images based on the calculated image gradients.

Then, the correspondence between the adaptive patches may be defined. For this purpose, a piecewise quadratic polynomial may be used.

In the image reconstruction step, images of the projection object 20, as seen from the viewpoint of the projectors 41, i.e. projector views, are virtually reconstructed based on the images captured by the cameras 51 using the information on the pixel correspondence between the images projected on the projection object 20 and the images captured by the cameras 51.

Figure 12:
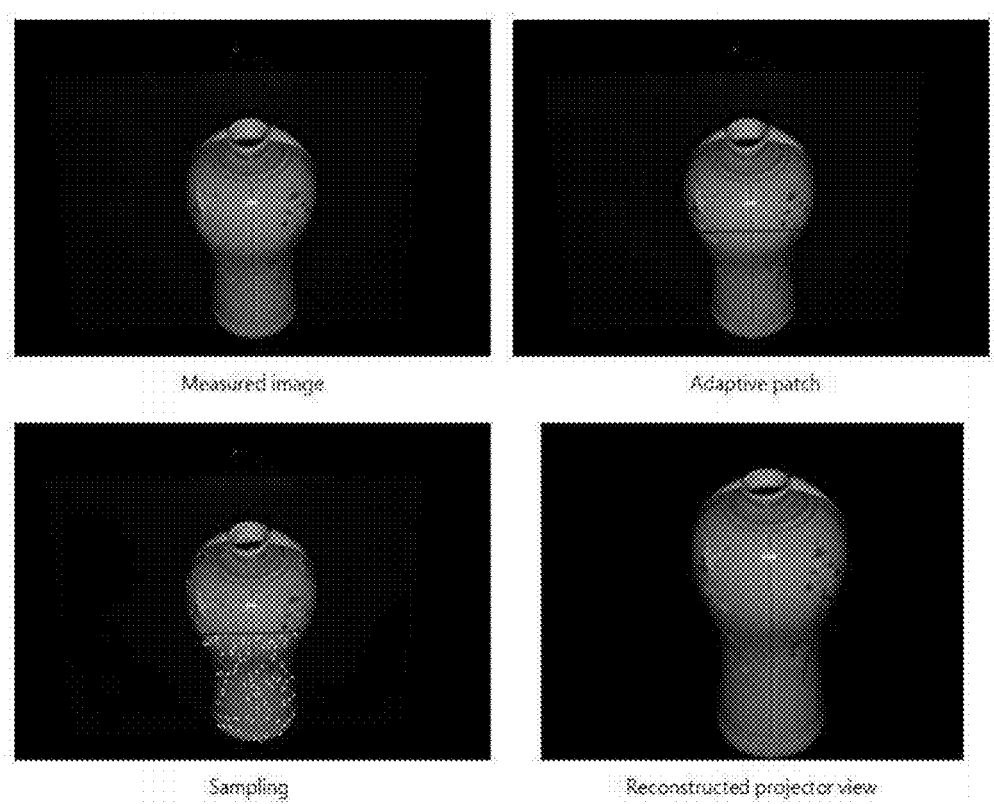
FIG. 12 shows images of a process of reconstructing a projector view in accordance with the hologram display method of the present invention.

Once the pixel correspondence between the images projected on the projection object 20 and the images captured by the cameras 51 is defined, the images obtained by the camera 51 may be mapped in a virtual projection space, thereby reconstructing the projector views, which are virtual images of the projection object 20, as seen from the viewpoint of the projectors 41. FIG. 12 is real images showing a process of reconstructing the projector views.

In the step of estimating a three-dimensional geometry (S153), three-dimensional geometry information (3D point cloud) of the projection surface seen from the viewpoint of the projectors 41 is estimated based on the calibration information of the projectors and the cameras 51 obtained in the calibration step (S151) and the information on the pixel correspondence between the images projected by the projector and the images captured by the cameras 51. The three-dimensional geometry information includes a depth map and the shape of a point cloud.

In the step of estimating a posture (S154), the posture of the three-dimensional image is estimated based on the three-dimensional geometry information obtained in the step of estimating a three-dimensional geometry (S153). Since the posture of the three-dimensional image is suitably estimated for the position of the projectors 41 based on the three-dimensional geometry information, the three-dimensional image can be projected on the projection object 20 without skew.

Figure 13:
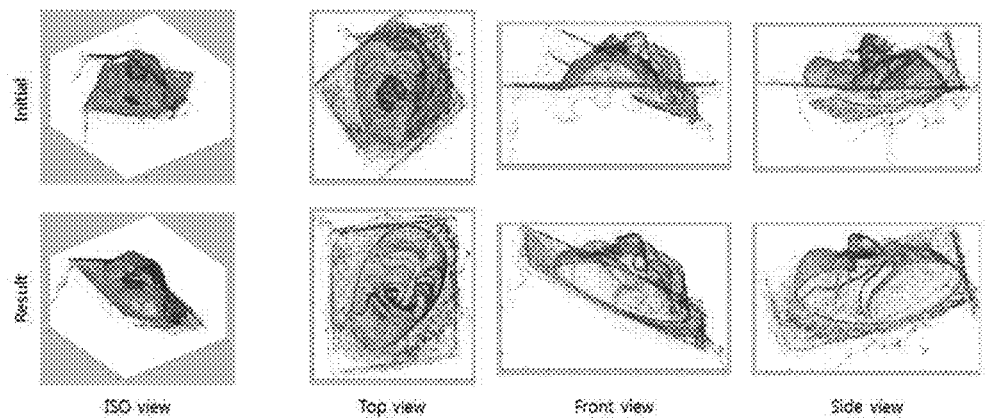
FIG. 13 shows images obtained through a posture estimation step of the hologram display method of the present invention.

FIG. 13 shows an exemplary method of estimating the posture of a three-dimensional virtual Hahoe mask model through matching between the three-dimensional virtual model and measured data. In FIG. 13, the red portion is a pre-measured three-dimensional virtual model, and the blue point cloud is information on a three-dimensional geometry of the projection object 20 from the viewpoint of the projectors 41, as measured using the projectors 41 and the cameras 51. Referring to FIG. 13, the virtual model and the measured data, the initial positions of which are matched, are aligned with one another by an ICP-based point cloud matching method. After estimation of the posture of the virtual three-dimensional model, the appearance, texture, and color of the virtual three-dimensional model are rendered according to preference of a user, followed by projection using the projectors 41, thereby providing a 3D projection map allowing the three-dimensional image to be fitted onto the projection object 20 without skew.

In the step of installing a reflector (S160), a reflector 30 is disposed adjacent to the projection object 20 to reflect images reflected by the projection object 20, thereby providing holographic augmentation. The reflector 30 is disposed on the table 21 and above the projection object 20. Here, the reflector 30 extends in a front and back direction and is disposed at an angle such that a front end thereof is located above a rear end thereof. Preferably, the reflector is disposed at an angle of 45° with respect to an upper surface of the table 21 on which the projection object 20 is disposed.

The step of displaying (S170) is a step in which the unit images are projected on the projection object 20 by the projectors 41 after completion of the setting step (S150) and the reflector installation step (S160) and includes a unit image setting step and a unit image projection step.

In the unit image setting step, partial images of the three-dimensional image corresponding to projection areas of the projection object 20 covered by the respective projectors 41 are set as the unit images. Here, the unit images are preferably two-dimensional images from the viewpoint of the respective projectors 41.

In the unit image projection step, the unit images are projected on the projection object 20 using the respective projectors 41. Here, there are overlapping portions between the unit images projected on the projection object 20 by the projectors 41. The controller 53 may adjust the unit images projected by the projectors 41 to prevent the overlapping portions from being skewed.

When the two-dimensional unit images are projected on the projection object 20 by the projectors 41, the unit images are reflected from the projection object 20 at an angle of 45°. Then, the images reflected from the projection object 20 are reflected by the reflector 30 disposed at an angle of 45° with respect to the projection object 20, whereby an augmented holographic image is formed above the table 21.

Figure 14:
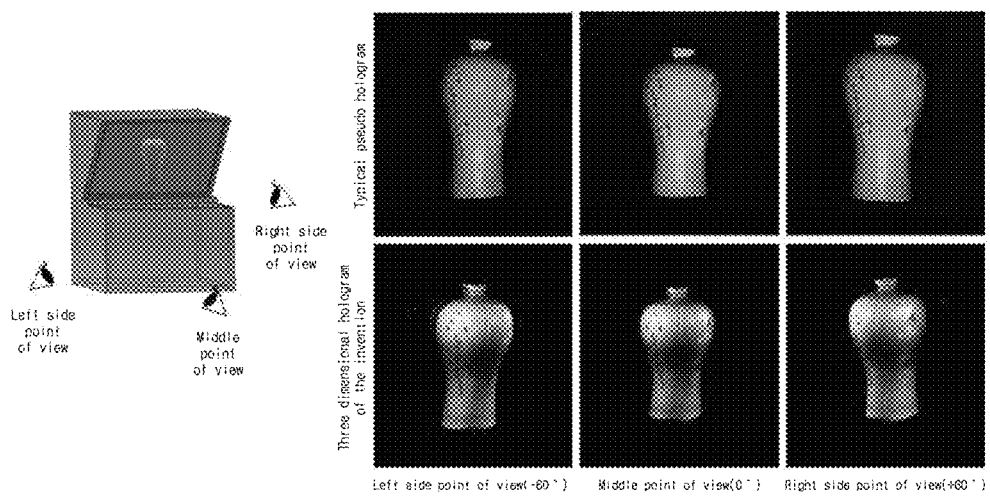
FIG. 14 shows images of an exhibit displayed using each of a typical holographic method and the holographic display system according to the present invention, as seen from various points of view.

As described above, in the holographic display system 10 according to the present invention and the hologram display method using the same, unit images corresponding to a three-dimensional image of an original item are projected on a projection object 20 having a three-dimensional shape corresponding to the original item using the plurality of projectors 41, and reflected by the projection object 20 and then augmented by the reflector 30, thereby providing a virtual image having three dimensional information corresponding to the original item, whereby a proper image can be provided to an observer even when the viewpoint of the observer is changed. FIG. 14 shows images of an exhibit displayed using each of a typical holographic method and the holographic display system 10 according to the present invention, as seen from various points of view. Referring to FIG. 14, the holographic display system 10 according to the invention can provide a more proper image from different points of view of an observer than the typical holographic method.

Descriptions of the embodiments are provided so as to be used or practiced by those skilled in the art. Various modifications of these embodiments will become apparent to those skilled in the art and general principles defined herein will be applied to other embodiments without departing from the scope of the present invention. Accordingly, the inventive concept is not limited to such embodiments, but rather to the broader scope of the presented claims and various obvious modifications and equivalent arrangements.

What is claimed is:

1. A holographic display system, comprising:
a projection object having a three-dimensional shape corresponding to an original item;
an image projection unit comprising a plurality of projectors projecting unit images of parts selected from a three-dimensional image of the original item on the projection object; and
a reflector disposed adjacent to the projection object and reflecting images reflected from the projection object to provide an augmented three-dimensional holographic image.

2. The holographic display system according to claim 1, further comprising:
a skew prevention unit controlling the image projection unit to prevent the unit images projected on the projection object by the projectors from being skewed.

3. The holographic display system according to claim 2, wherein the skew prevention unit comprises: a plurality of cameras disposed adjacent to the respective projectors and capturing the unit images projected on the projection object by the respective projectors; and a controller controlling the projectors and the cameras to prevent the unit images projected on the projection object from being skewed based on image information obtained by the cameras.

4. The holographic display system according to claim 3, wherein the skew prevention unit further comprises an image guide unit guiding the cameras for the cameras to capture images of the unit images projected on the projection object, as seen from the viewpoint of the respective projectors.

5. The holographic display system according to claim 4, wherein the image guide unit comprises a plurality of beam splitters provided to each of the projectors and transmitting output light emitted from the projector to the projection object and reflecting fractions of light reflected by the projection object which are incident toward the projector in a direction parallel to an optical axis of the output light toward the cameras.

6. A hologram display method, comprising:
photographing a three-dimensional image corresponding to an original item;
fabricating a projection object having a three-dimensional shape corresponding to the original item;
installing a plurality of projectors to project unit images of parts selected from the three-dimensional image corresponding to the original item on the projection object;
installing cameras to capture the unit images projected on the projection object by the projectors;
setting the projectors and the cameras to prevent the unit images emitted from the projectors from being skewed;
installing a reflector adjacent to the projection object to reflect images reflected by the projection object to provide an augmented holographic image; and
displaying the holographic image by projecting the unit images on the projection object through the projectors.

7. The hologram display method according to claim 6, wherein setting the projectors and the cameras comprises:
calibrating the projectors and the cameras;
calculating a pixel correspondence between the images projected by the projectors and the images captured by the cameras;
estimating three-dimensional geometry information of a projection surface as seen from the viewpoint of the projectors based on calibration information of the projectors and the cameras obtained in the step of calibrating the projectors and the cameras and information on the pixel correspondence between the images projected by the projector and the images captured by the cameras and obtained in the step of calculating the pixel correspondence; and
estimating a posture of the three-dimensional image based on the three-dimensional geometry information obtained in the step of estimating three-dimensional geometry information.

8. The hologram display method according to claim 7, wherein calibrating the projectors and the cameras comprises:
projecting a setting image having a predetermined pattern on a setting plate having a predetermined pattern through the projectors, followed by photographing the setting image using the cameras;
acquiring calibration information for calibrating the projectors and the cameras based on the setting image and image information obtained by capturing the setting image projected on the setting plate; and
calibrating the projectors and the cameras based on the calibration information to complete setting.

9. The hologram display method according to claim 8, wherein a projection surface of the setting plate on which the setting image is projected from the projectors has a checkered pattern.

10. The hologram display method according to claim 7, wherein photographing a setting image includes sequentially varying the setting position of the setting plate to various postures and projecting setting images having different patterns on the setting plate according to the setting position.

11. The hologram display method according to claim 8, wherein photographing a setting image includes sequentially varying the setting position of the setting plate to various postures and projecting setting images having different patterns on the setting plate according to the setting position.

12. The hologram display method according to claim 7, wherein calculating a pixel correspondence comprises:
projecting a sample image on the projection object through the projectors, followed by capturing an image of the projection object with the sample image projected thereon using the cameras; and calculating information on a pixel correspondence between images projected on the projection object by the projectors and images of the projection object captured by the cameras through comparison of the sample image with the images captured by the cameras.

13. The hologram display method according to claim 12, wherein the sample image has a pattern in which multiple black unit patterns extending in one of longitudinal and transverse directions of the projection object are arranged at a distance from one another in the other direction of the projection object.

14. The hologram display method according to claim 12, wherein calculating a pixel correspondence further comprises: virtually reconstructing images of the projection object, as seen from the viewpoint of the projectors, based on the images captured by the cameras using the information on the pixel correspondence between the images projected on the projection object and the images captured by the cameras obtained in the step of calculating the information on the pixel correspondence.

15. The hologram display method according to claim 13, wherein calculating a pixel correspondence further comprises: virtually reconstructing images of the projection object, as seen from the viewpoint of the projectors, based on the images captured by the cameras using the information on the pixel correspondence between the images projected on the projection object and the images captured by the cameras obtained in the step of calculating the information on the pixel correspondence.

16. The hologram display method according to claim 6, wherein installing the cameras comprises:

primarily installing the cameras adjacent to the respective projectors; and secondarily installing an image guide unit guiding the cameras for the cameras to capture images of the unit images projected on the projection object, as seen from the viewpoint of the projectors, on each of the projectors and the cameras.

17. The hologram display method according to claim 16, wherein the image guide unit comprises a plurality of beam splitters provided to each of the projectors and transmitting output light emitted from the projector to the projection object and reflecting fractions of light reflected by the projection object which are incident toward the projector in a direction parallel to an optical axis of the output light toward the camera.

18. The hologram display method according to claim 7, wherein displaying the holographic image comprises:

setting partial images of the three-dimensional image corresponding to projection areas of the projection object covered by the respective projectors as the unit images; and projecting the unit images on the projection object using the respective projectors.

* * * * *